United States Patent [19]

Lange

[11] 4,312,009

[45] Jan. 19, 1982

[54] DEVICE FOR PROJECTING INK DROPLETS ONTO A MEDIUM

[75] Inventor: Francois Lange, Ris-Orangis, France

[73] Assignee: Smh-Adrex, Paris, France

[21] Appl. No.: 118,726

[22] Filed: Feb. 5, 1980

[30] Foreign Application Priority Data

Feb. 16, 1979 [FR] France ................................ 79 04012

[51] Int. Cl.[3] ........................................ G01D 15/18

[52] U.S. Cl. ................................ 346/140 R; 101/1; 250/316.1; 430/348

[58] Field of Search ........................ 346/140 R, 1.1; 250/316.1, 317.1, 318, 319; 430/31, 348; 101/1

[56] References Cited

U.S. PATENT DOCUMENTS

| | | | |
|---|---|---|---|
| 2,487,865 | 11/1949 | Glassey | 346/33 X |
| 2,556,550 | 6/1951 | Murray | 430/348 |
| 3,177,800 | 4/1965 | Welsh | 101/1 |
| 3,179,042 | 4/1965 | Naiman | 101/1 |
| 3,553,708 | 1/1971 | Carreira | 346/1.1 |
| 3,582,954 | 6/1971 | Skala | 101/1 |
| 3,640,214 | 2/1972 | Steinhutte | 346/140 |
| 3,655,379 | 4/1972 | Gundlach | 250/318 |
| 3,790,703 | 2/1974 | Carley | 346/140 X |
| 3,834,301 | 9/1974 | Croquelois | 346/75 |
| 3,884,684 | 5/1975 | Ohno | 430/103 |
| 3,927,410 | 12/1975 | Pimbley | 101/45 |
| 4,010,477 | 3/1977 | Frey | 346/1.1 |
| 4,117,497 | 9/1978 | McGroddy | 346/17 |

FOREIGN PATENT DOCUMENTS 2368362 9/1977 France .

OTHER PUBLICATIONS

Camphausen D. L.; Photoactivated Ink Spray, Xerox Disc. Journal, vol. 1, No. 4, Apr. 1976, p. 75.

*Primary Examiner*—Joseph W. Hartary
*Attorney, Agent, or Firm*—Kenyon & Kenyon

[57] ABSTRACT

A device for projecting ink droplets through a set of projection holes to print a pattern under selective electrical or light pulse control.

A first plate formed with a large number of holes is placed in close proximity to the surface of the printing medium. A second plate a small distance from the first defines therewith a chamber in which the ink is locally heated by electrical current controlled by light selectively impinging on a photoconductive part of said second plate in register with each hole or each group of holes so as to form a pattern with constant or variable parts.

11 Claims, 20 Drawing Figures

DEVICE FOR PROJECTING INK DROPLETS ONTO A MEDIUM

The present invention concerns a device for projecting ink droplets onto a medium, and in particular a device for printing patterns onto small media such as postal packets, labels and tickets.

Known in the prior art are ink jet or droplet machines in which the ink is in equilibrium at the projection orifice under the combined effect of hydrostatic pressure and surface tension. The ink droplet is projected via the orifice from a chamber containing the ink and defined by two plates, one of which is formed with the projection holes. A voltage is applied between the two plates and a laser beam is passed through the plate with no holes. The ink is subjected to an electrostatic field and comprises photoconductive pigments which are displaced towards the plate with the holes. In this domain, the state of the art is described in an article by D. L. Camphausen in the Xerox Disclosure Journal, volume 1, number 4, April 1976 under the title: "Photoactivated ink spray" (page 75).

This device requires the use of photoconductive pigments, consisting of extremely fine particles dispersed in the ink. Moreover, the phenomena used are exclusively electrostatic, the effect of light on the photoconductive pigments resulting in movement of these particles.

As the electrostatic forces generated are very weak, the device is only operable if, in the absence of the laser beam, the ink is retained by a very low capillary force. Under these circumstances, the least impact can result in unwanted projection of ink.

The device in accordance with the present invention is intended to reduce the effects of this disadvantage. In the device according to the invention, operation is more reliable as a result of the use of thermal methods to increase the temperature of a photoconductive material, thereby increasing the pressure of the ink.

The present device comprises in a device for projecting ink droplets onto a medium so as to form dots defining one or more patterns, said dots being selected from an array of dots, the device comprising a perforated first plate which in use is substantially parallel to and spaced by a small distance from the medium, a second plate attached and substantially parallel to the first plate and defining therewith a chamber for containing the ink to be deposited on the medium, and means for projecting from selected holes small quantities of ink by heating the ink in the portion of the chamber corresponding to the selected hole by the application of voltage to at least one plate in conjunction with the passage of radiation through the second plate, characterised in that said second plate comprises a layer of photoconductive material whose electrical resistivity is reduced by exposure to said radiation.

The invention also comprises in a system for printing on small media such as postal packets, labels and tickets patterns comprising a constant part and a variable part, said system including a device of the aforementioned type and being characterised in that it comprises first means for printing the variable part of the pattern by depositing droplets of ink from selected holes of a first set of holes and second means for printing the constant part of the pattern by depositing droplets of ink from all holes of a second set of holes which is either defined in a fixed manner for each device or modifiable in each device by the replacement of a component thereof.

The invention will now be described by way of non-limiting example and with reference to the accompanying drawings, in which the same reference numerals are used throughout to indicate the same components.

Figure 4A:
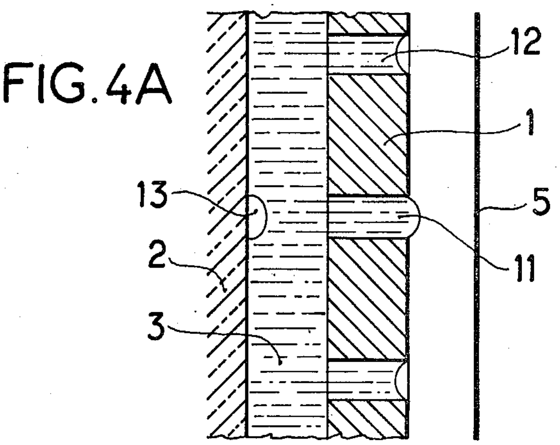
Figure 4B:
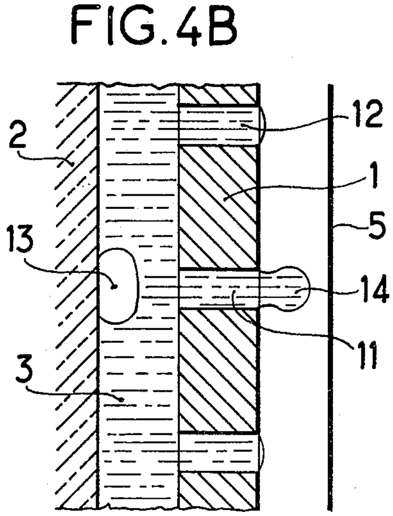
Figure 4C:
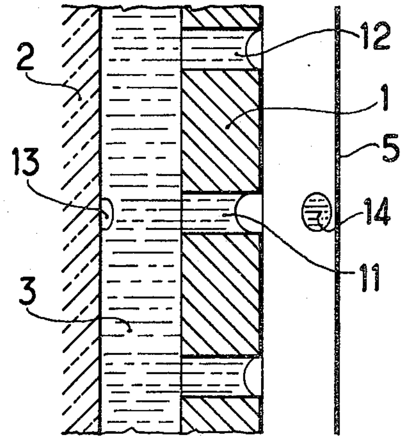

FIGS. 4*a*, 4*b*, 4*c* illustrate the process whereby an ink droplet is projected from the device.

Figure 5:
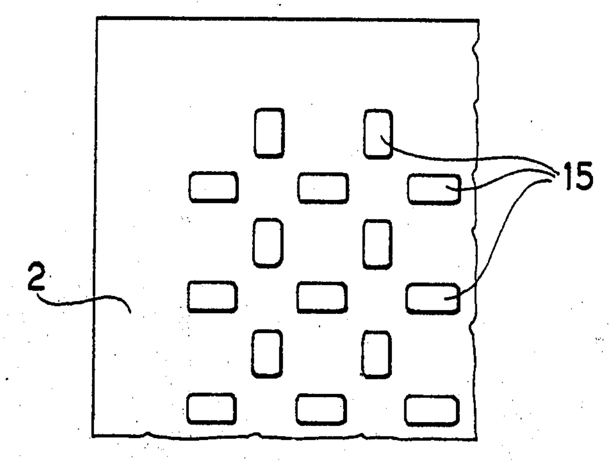
Figure 6:
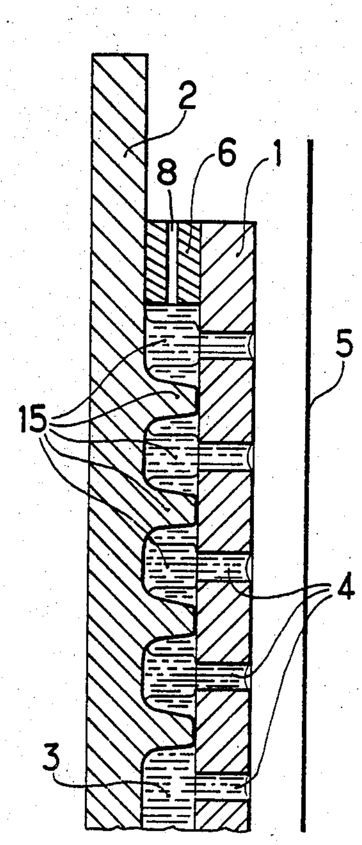

FIGS. 5 and 6 show a version of the device in which projections are formed between the ink projection holes.

Figure 7A:
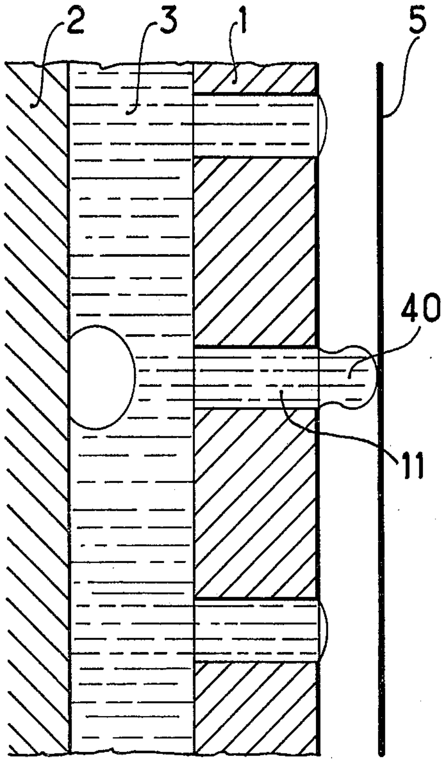
Figure 7B:
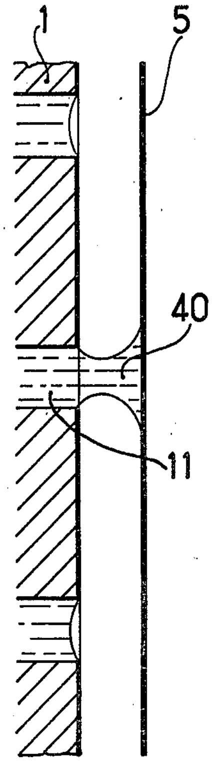
Figure 7C:
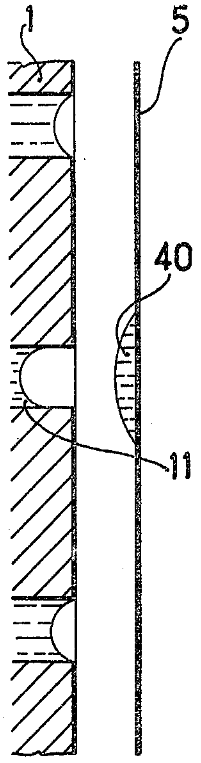

FIGS. 7*a*, 7*b* and 7*c* illustrate an alternative ink projection process.

Figure 8:
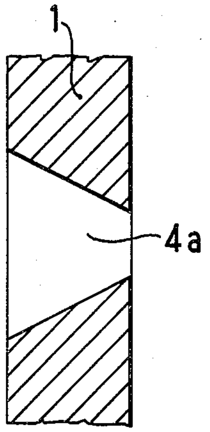
Figure 9:
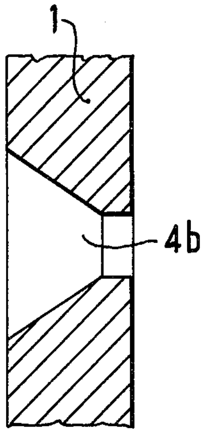
Figure 10:
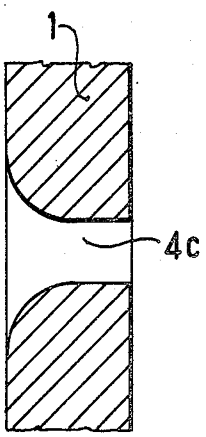

FIGS. 8, 9 and 10 show possible shapes for the ink projection holes, as seen in cross-section.

Figure 11:
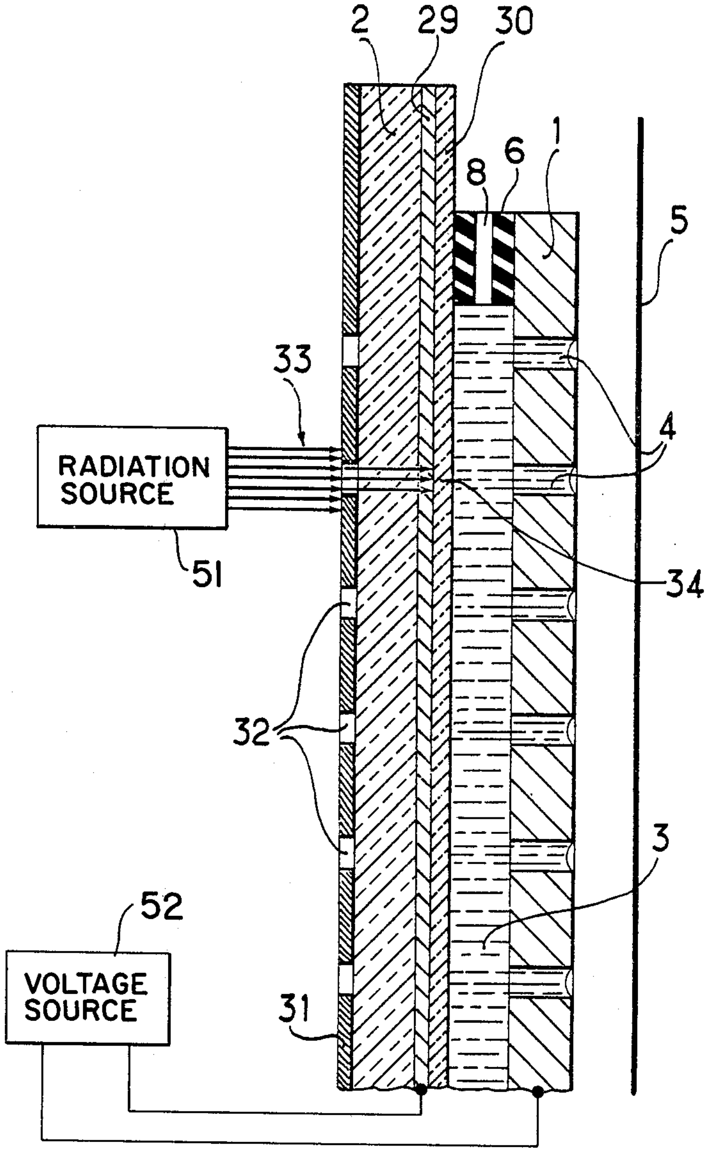

FIG. 11 is a cross-section through part of a device in which the passage of an electric current through the ink is controlled by illuminating a photoconductive layer.

Figure 12:
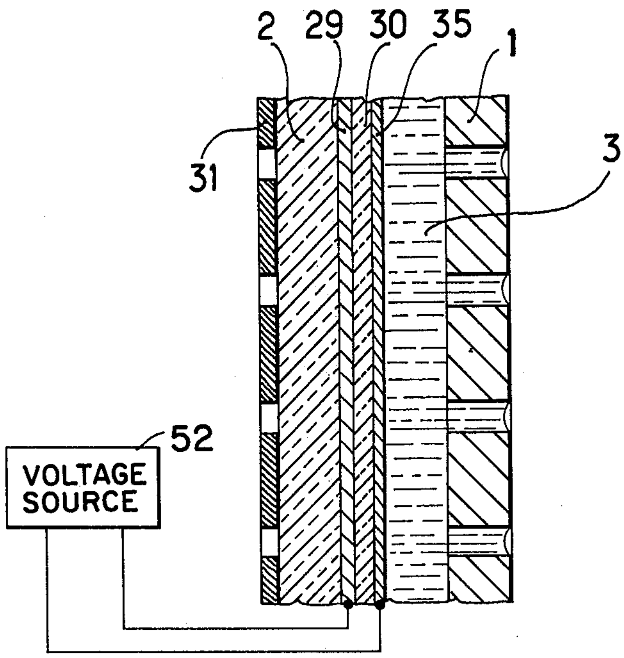

FIG. 12 is a cross-section through a photoconductive device with an additional layer deposited on the photoconductor.

Figure 13:
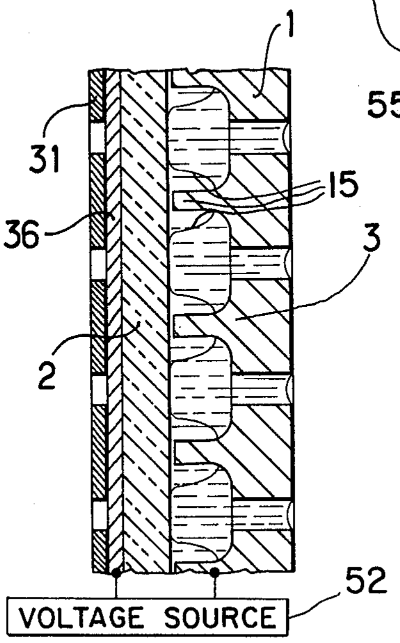

FIG. 13 is a cross-section through a device using a massive photoconductive plate.

Figure 14:
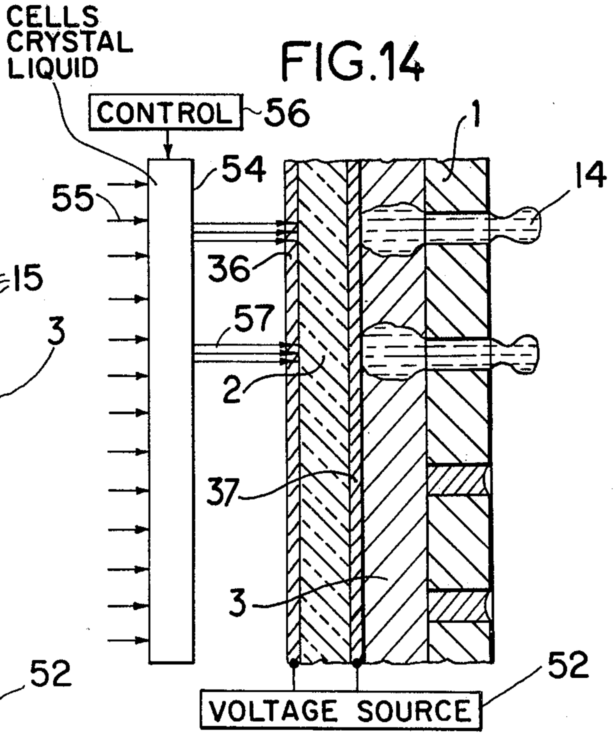

FIG. 14 is a cross-section through a device using a photoconductive plate with a conducting layer on each side.

Figure 15:
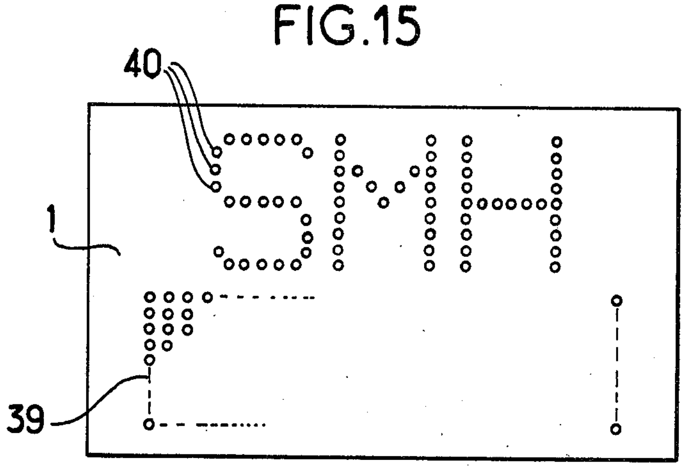

FIG. 15 shows a perforated plate for printing a pattern comprising a constant part and a variable part, as seen from the chamber containing the ink.

Figure 16:
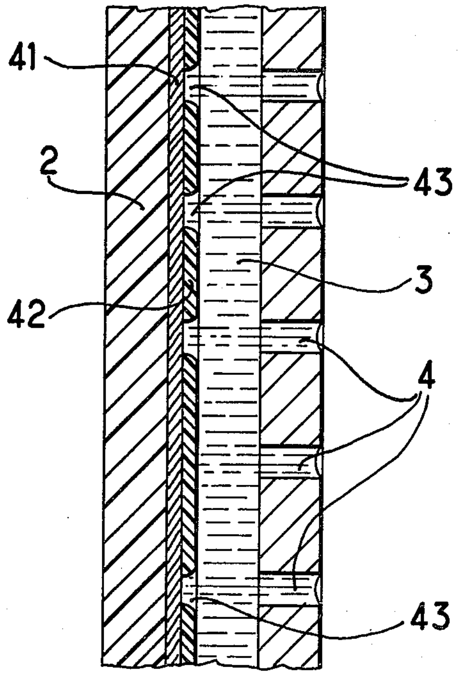

FIG. 16 is a cross-section through a device for printing a constant pattern, in which a pulsed electric current is passed through the ink.

Figure 1:
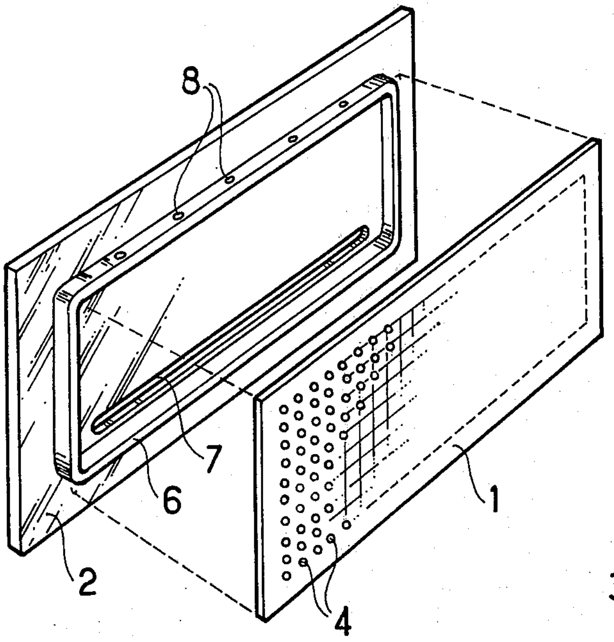
FIG. 1 is an exploded perspective view of the basic device according to the invention.
Figure 2:
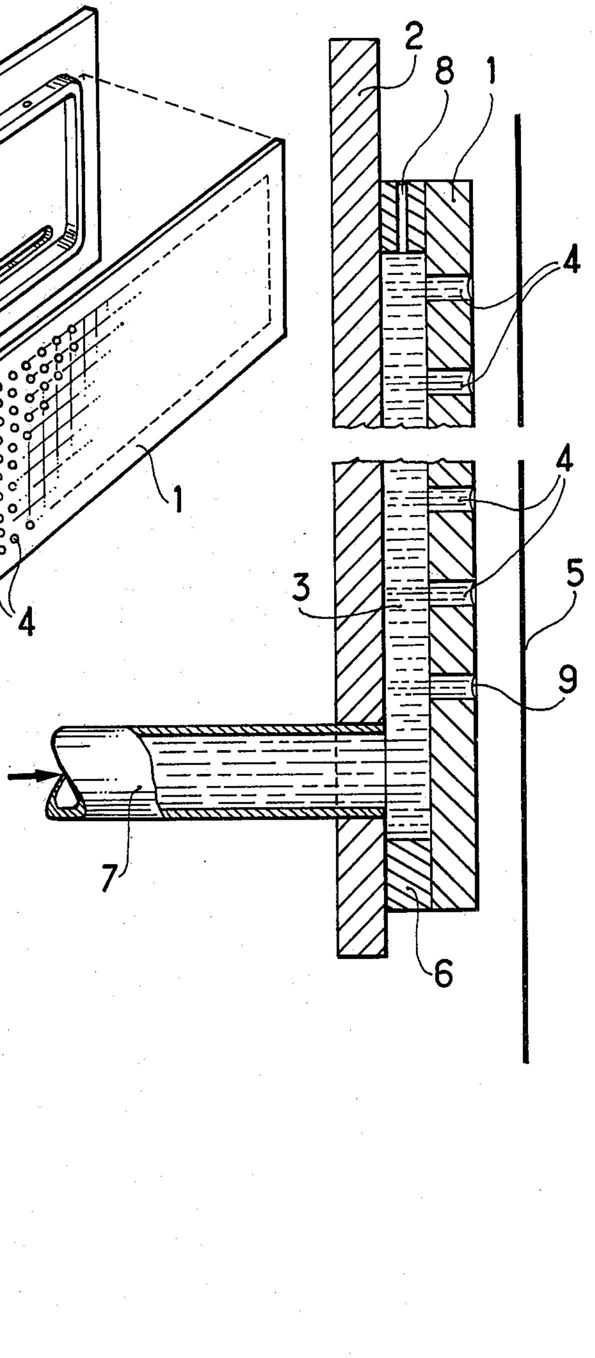
FIG. 2 is a vertical cross-section through the device to a much larger scale.

The basic device is shown in FIGS. 1 and 2. A plate 1 is pierced with holes 4 and defines, in combination with a rear plate 2, a chamber 3 containing ink to be deposited. A printing medium 5 is located opposite the plate 1. Ink is fed into the device through a conduit 7 opening into the plate 2 at one end and connected at the other end to an ink reservoir (not shown). The surface of the ink in the reservoir is at approximately constant level and is exposed to ambient atmospheric pressure. Ink is maintained in the chamber 3 and in the holes 4 by the combined effect of capillary forces and the pressure difference due to the difference in level between the surface of the ink in the reservoir and the holes 4. The level of the ink in the reservoir may be below the holes 4, in which case the surface of the ink forms a concave meniscus 9 at the ends of the holes 4, as shown in FIG. 2. If the level of the ink in the reservoir is above the holes 4, the menisci are convex, projecting beyond the surface of the plate 1. The pressure difference $\Delta P$ across a meniscus is, according to Laplace's law: $\Delta P=2T/\phi$, where T is the surface tension of the ink and $\phi$ is the radius of curvature of the meniscus. In the ideal situation in which the ink wets the walls of the holes 4 fully but does not wet the outer surface of the plate 1, which would thus have to be treated accordingly, $1/\phi$ may vary between $+1/R$ and $-1/R$, where R is the radius of the holes 4.

The pressure difference $\Delta P$ may therefore, in theory, vary between $-2T/R$ and $=2T/R$, this difference being defined by the difference in level between the reservoir and the hole. In practice it is necessary to include a safety margin represented by the quantity $2T/R-\Delta P$, in order to eliminate the risk of accidental projection of ink, in the event of an impact or mechanical vibration, for example. This value is also that of the minimum local overpressure required for controlled projection of ink, which will accordingly be all the easier as $2T/R-\Delta P$ is lower. In practice it is difficult to guarantee the wetability properties of the outer surface of the plate 1, due to wear and the presence of dirt. This leads to the requirement for values of $2T/R-\Delta P$ with $\Delta P$ negative, in other words for systems operating at reduced pressure. The manner and the place at which the conduit 7 opens into a hole formed in the plate 2 is indicated by way of example only. This could equally well open into any other point of the chamber 3 not occupied by other components of the device. The ink passage cross-section must, however, be sufficiently large to supply the flowrate corresponding to the maximum rate of projection of ink droplets. An inlet hole could be formed in the plate 1 or seal 6, for example, or the feed could comprise a number of conduits terminating at various points in the chamber 3. Foreign bodies likely to block the holes 4 could be removed by means of one or more filters located between the reservoir and the chamber 3.

As the pressure in the chamber 3 varies as the level of ink in the reservoir falls as ink is consumed, the device may be improved by connecting into the conduit 7 a pump and pressure regulator system. The use of a pump also permits the use of filters representing higher head losses, so increasing the efficiency of filtration.

If the thickness of the chamber 3 is not too large (for example, not more than half the shortest distance between the holes in the plate 1), ink is retained between plates 1 and 2 by surface tension alone, without the need for sealing walls to close off the perimeter of the chamber. Nevertheless, the device as shown in FIGS. 1 and 2 comprises a seal 6 providing a mechanical connection between plates 1 and 2 and closing the chamber 3 around its entire perimeter. At the top, this seal 6 is pierced with holes 8 for venting bubbles of air or gas which may appear in the chamber 3. These holes are at the highest point of the chamber when arranged for operation in a vertical position as shown in FIG. 2. If the device were arranged for operation in some other position, horizontal, for example, these holes would need to be located elsewhere.

FIG. 1 shows one possible arrangement of the holes in plate 1. To print a given pattern, certain holes are selected and a droplet of ink is projected through each of the selected holes to print a dot on the surface of the medium 5. The pattern is therefore formed by a mosaic or matrix array of dots. To improve the definition of the pattern the device may be moved relative to the medium 5 by a distance which is a fraction of the separation between adjacent holes, further ink being projected through certain holes. Ink droplets may be projected a number of times in succession, each occasion being preceded by the movement of the device relative to the medium 5 such that the matrix array of dots printed on the medium 5 comprises a number of dots which is a multiple of the number of holes 4 in the plate 1.

To this end, a system is provided for moving the assembled plates 1 and 2 relative to the medium, in one or two directions parallel to the plane of said plates. The joined plates 1 and 2 are attached to a frame through the intermediary of two or more deformable components incorporating springs or leaf springs, each providing for relative movement in a particular direction between the printing device and the printing medium. The device may be moved by electromagnets, each electromagnet placing the device in a particular position, corresponding to the direction of movement produced by the electromagnet, and being one of a number of possible positions of the device.

Figure 3:
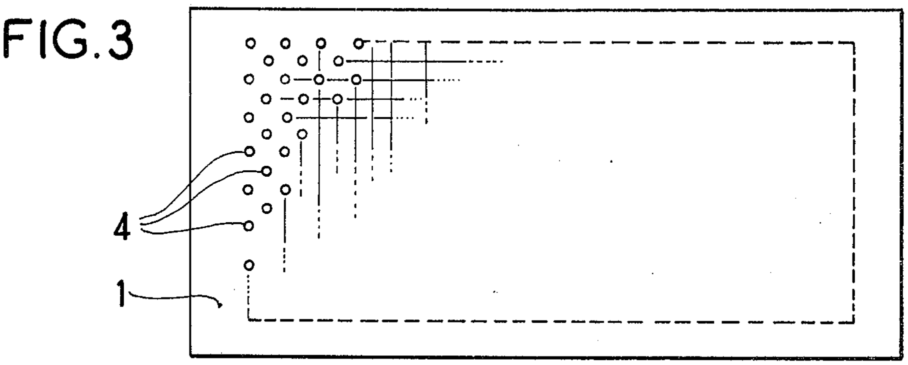
FIG. 3 shows an alternative arrangement of the holes in the perforated plate 1.

FIG. 3 shows an alternative arrangement of the holes 4 in the plate 1. In this arrangement, successive lines of the holes 4 are staggered so that a single displacement parallel to the longer or shorter edge of the plate 1 produces on the medium 5 a matrix of regularly spaced dots in which the number of dots is twice the number of holes 4.

FIGS. 4*a*, 4*b* and 4*c* show three successive stages in the projection of a droplet of ink through a hole 11 which is one of the holes 4. To trigger projection, the ink is suddenly heated in the vicinity of the hole 11. This heating may be produced by directing an intense beam of radiant energy onto the hole 11 through the plate 2. This beam may be a laser beam, for example. The plate 2 must in this case be transparent to the radiation used, and the ink must be highly absorbent for the same radiation. If no suitable ink is available, the surface of the plate 2 in contact with the ink may be covered with a layer of radiation absorbing material, the heat generated in this layer being transferred to the ink by conduction. Other means of producing local heating will be described below.

Heating the ink decreases its viscosity and surface tension, so reducing the quantity of energy required to project a droplet of ink, and also causes the ink to vaporise, producing a gas bubble 13 which forces the ink in front of it through the hole 11, the pressure inside the bubble increasing to overcome the forces opposing movement of the ink, which are the surface tension, viscosity and inertia of the ink. The increase in pressure is also transmitted through the ink contained in the chamber 3 towards the hole 12, from which no ink droplet is to be projected. As shown in FIG. 4*b*, the expansion of the gas bubble 13 forms a droplet 14 and also causes the meniscus in hole 12 to become convex. In FIG. 4*c* the droplet 14 has become detached from the plate 1 and is moving towards the medium 5. With the source of heat deactivated, the gas bubble collapses and sucks the meniscus back inside the hole 11, ink being subsequently drawn from the reservoir via the conduit 7 and the chamber 3 by capillary action, replacing the volume of ink lost in the projected droplet. To prevent the unwanted projection of a droplet from the adjacent hole 12 the resistance to movement of the ink along the path from the bubble 13 to the hole 12 must be significantly greater than that on the path from the bubble 13 to the hole 11. This is achieved by selecting the shape and dimensions of the device to produce different inertia and viscosity forces along the respective paths. In the device shown in FIG. 2, this is achieved by selecting a low value of the ratio of the thickness of the chamber 3 to the distance between the holes 4. An upper limit for this ratio is approximately ½. This limit may be exceeded, however, in the event that the ink used has a viscosity of surface tension which varies to a sufficient extent with temperature. In this case the ink in the hole 11 will be sufficiently heated to be readily projected, whereas that in the hole 12 will remain at its initial temperature, requiring a higher force to project it.

FIGS. 5 and 6 show another version of the device in which the plate 2 has projections 15 regularly arranged so as to come between the positions of the holes 4 in the plate 1, in order to prevent movement of ink between adjacent holes and thereby eliminate unwanted projection of droplets. These projections may be formed by a photo-engraving process. They need not necessarily have a height corresponding to the thickness of the chamber 3, as in the embodiment shown in FIG. 6. The arrangement shown in FIG. 6 has the advantage that correct spacing of plates 1 and 2 is assured, however. The projections 15 may be formed on plate 1 instead of plate 2 (as shown in FIG. 13), or they may be formed on both plates.

Reducing the cross-section of the passages between adjacent holes, either by reducing the thickness of the chamber 3 or by means of an arrangement such as is shown in FIGS. 5 and 6, also reduces the maximum flowrate of ink, as shown in FIG. 14 circulation within the chamber and therefore the maximum projection frequency.

A specific application of the arrangements described hereinabove is the use of an ink of very high viscosity or which is solid at normal operating temperature. In this case the sudden temperature rise in the vicinity of the selected projection hole produces local liquefaction of the ink. The ink in the adjacent holes remains solid or highly viscous, so that the risk of unwanted droplets being projected from these holes is eliminated. Projection may be caused by partial evaporation as already described in the case of a fluid ink or by a mechanical shock applied to the device in the direction parallel to the axes of the projection holes 4, or by mechanical vibration of the assembly, using piezoelectric ceramic actuators, for example. When using a solid or highly viscous ink, means are provided for heating the device as a whole so as to fluidise all the ink contained in the device after each droplet projection cycle, in order to replace the ink projected from the holes 4.

In the system as described with reference to FIGS. 4*a*, 4*b* and 4*c* the surface of the medium 5 is at a relatively large distance from the plate 1 so that the droplets have sufficient space to form and move. In another arrangement show in FIGS. 7*a*, 7*b* and 7*c* the distance between the plate 1 and the printing medium 5 is too small for the ink droplet 40 to be detached from the hole 11 before reaching the medium 5. This reduces the amount of energy required to project the droplet, the ink in contact with the medium 5 adhering thereto by capillary action. This mode of operation presupposes that the surface of the medium 5 is flat to within the dimensions of the ink droplets.

When using solid ink (see above), the medium 5 may be placed in contact with the plate 1, the melting of the ink then being sufficient to mark the corresponding dot.

The holes 4 in the plate 1 are preferably cylindrical since this facilitates manufacture. The diameter of these holes determines the dimensions of the projected droplets, and is preferably between 10 and 100 microns. Economical methods for forming large numbers of small holes include, for example, the use of laser and electron beams, ultrasonic methods and chemical etching. The plate 1 with its holes may also be formed by an electrochemical method, in which case the holes 4*c* will be of a shape similar to that shown in FIG. 10. Conical holes 4*a* as shown in FIG. 8 and part-conical holes 4*b* as shown in FIG. 9 are more suitable than cylindrical holes but are more difficult to manufacture.

Materials which may be used for plates 1 and 2 include, for example, stainless steel, glass, nickel, alumina ceramics, tungsten and plastics materials.

Localised heating of the ink in the vicinity of the selected projection hole by the absorption of radiation is only one of a number of possibilities. An alternative heating method is to use resistances deposited in layers on the plate 2. Alternatively, electrodes may be arranged on plates 1 and 2 so as to pass a pulsed electric current through the ink in the vicinity of the selected hole, the ink having sufficient electrical resistivity to produce adequate heating through the $I^2R$ effect. An alternative is to use an insulative ink through which a pulse of electric current is passed due to the electric field in the ink locally exceeding its dielectric strength, resulting in dielectric breakdown of the ink and consequent heating.

FIG. 11 shows an electrically heated embodiment of the projection device which may be formed with a very large number of projection holes. In this embodiment, the plate 2 is covered with a layer 29 of electrically conductive material, the plate 2 and layer 29 being transparent to electromagnetic radiation. The layer 29 may have an electrical resistivity of between $10^{-6}$ ohm-meter and 50 ohm-meters and is covered with a layer 30 of a photoconductive material whose electrical resistivity is substantially reduced (for example, in the ratio ten to one) when illuminated by the electromagnetic radiation to which the assembly is transparent. The photoconductive material may be, for example, silicon, germanium, or cadmium sulphide. The ink contained in chamber 3 is resistive, and plate 1 is electrically conductive or carries an electrically conductive layer on the side facing the chamber 3. It is electrically insulated from plate 2 by insulating seal 6. To project a droplet of ink, region 34 of the photoconductive layer 30 facing the selected hole is illuminated through a mask 31 and plate 2 by a narrow beam 33 of the appropriate electromagnetic radiation from a radiation source 51. The resistivity of region 34 therefore decreases sharply, permitting a pulse of electric current to pass through the ink when a voltage is applied between plate 1 and layer 29 from a voltage source 52. An ink droplet is then projected as already described. To this end, the resistivity of the ink must be adjusted as a function of the electrical voltage used, the dimensions of the device and the temperature rise required. For example, ink with a high water content may be used, its resistivity being adjusted by the addition of sodium chloride or hydrochloric acid. Resistivities between 50 and 0.05 ohm-meters can be produced in this way.

The mask 31, although not indispensable to the operation of the device, facilitates the control of the position and size of the region 34. It comprises a layer of a material which is opaque to the radiation used, with apertures 32 formed in it opposite the holes 4 in the plate 1.

The duration of the current pulse may be determined by the period for which the beam 33 is applied or by the period for which voltage is applied between layer 29 and plate 1. The radiation 33 may be obtained from various sources. One possible source is a laser beam which is deflected towards the selected holes by moving mirrors or acoustic/optical or electro-optical methods known in the laser art. An alternative approach is to use an array of laser diodes or light-emitting diodes (LEDs) in such a way that a diode is provided for each hole 4 or for a group of holes 4, the array being moveable relative to plate 1 so as to cover all holes. The array may be directly in contact with plate 2 or mask 31, or spaced at a certain distance therefrom. An optical system may also be placed between the diode array and the plate 2 so as to form on layer 30 an image of the array which is of reduced or increased size. Fresnel lenses may be used for this purpose, for example. A further approach is to place a mask in front of plate 2 which represents the pattern to be printed on the medium 5, the layer 30 being illuminated through this mask by one or more light sources such as incandescent lamps, fluorescent lamps or gas discharge lamps. The mask could comprise fixed parts for printing any constant sections of the patterns to be printed and moving parts for the variable sections. The fixed parts could be interchangeable or not, as appropriate, and the moving parts controlled automatically or manually. As shown in FIG. 12, a liquid crystal array or any other electrically controlled optical switching system could also be used to implement the mask, the liquid crystal array comprising a set of liquid crystal cells 54 located between the source of radiation 55 and the photoconductive material 2, the liquid crystal cells being selectively controlled by control means 56 to permit the radiation 57 to impinge on selected parts of the photoconductive layer 30.

For this system to operate correctly, the resistivity of the unilluminated photoconductor 30 must be sufficiently high relative to that of the ink used to insulate the ink from the layer 29. The resistivity of the illuminated photoconductor 30 must be sufficiently low relative to that of the ink to permit the passage of the electric current. An alternative is to use a photoconductor whose resistivity when illuminated is of the same order of magnitude as that of the ink, in which case the photoconductive layer 30 is heated at the same time as the ink, the heat produced within the photoconductor being transferred to the ink as when using a heating resistance. The resistivity of the illuminated photoconductor 30 may even be selected at a sufficiently high value for the heat generated by the electric current to be produced predominantly in the photoconductor. FIG. 12 shows a version of the device which, like that shown in FIG. 11, comprises a photoconductive layer 30, in this case separated from the ink in chamber 3 by an additional layer 35 of an electrically conductive material whose resistivity and thickness are selected so that, on passing the electric current, heat is generated predominantly in layer 35 or in layers 30 and 35. This offers the advantage of widening the permissible range of resistivity values for the ink, and of protecting the layer 30 in the event of chemical incompatibility between the ink and the material of the layer 30. The layer 35 may also be of a material which is a good conductor of electricity, the voltage pulse from a voltage source 52 being applied between layers 29 and 35, rather than between layer 29 and plate 1 as before. The heat required for projection is then generated only in layer 30. This arrangement imposes no limits in respect of resistivity value on the ink or the material of plate 1.

FIG. 13 shows a further embodiment of the photoconductive projection device in which plate 2 is of a photoconductive material such as silicon, the side not in contact with the ink being covered by a layer of electrically conducting material 36. This layer 36 may be fitted with a mask 31 if appropriate. In this device the ink is heated in a manner analogous to those applying to the previously described devices, voltage being applied between layer 36 and plate 1 by a voltage source 52. Plate 1 is of an electrically conductive material, and the ink contained in chamber 3 has a resistivity such that heat is generated predominantly in the ink, or in plate 2, or in the ink and plate 2. The surface of plate 2 facing the chamber 3 may be coated with an electrically conductive material 37, as shown in FIG. 14. In this case voltage may be applied between layers 36 and 37 by a voltage source 55, and the plate 1 and ink may have any value of resistivity.

The photoconductive material of layer 30 in FIGS. 11 and 12 may, for example, be cadmium sulphide a few microns thick. The resistivity of this material when not illuminated is greater than $10^8$ ohm-centimeter, whereas the resistivity when illuminated is approximately 100 ohm-centimeter. This material is sensitive to radiation at a wavelength of approximately 0.5 microns, so that the plate 2 may be of ordinary glass and the radiation source may be an incandescent light source. The thickness of chamber 3 may be some 10 to 50 microns, the ink having a resistivity of approximately 500 ohm-centimeter. The voltage required is then approximately 50 volts.

The various embodiments of the ink droplet projection device described above are suited to the printing of small patterns (30 $cm^2$, for example) since printing can in this case be carried out without any relative movement of the printing device and printing medium, or with movements of limited amplitude (for example, 1 mm). These devices are particularly suited to the printing of patterns with a constant part and a varying part, the constant part if necessary being modifiable by changing one or more components of the device.

The variable part of such patterns may be obtained using a device as shown in any of FIGS. 12 to 14, the constant part being formed in the same way or preferably using simplified versions of the same arrangement.

A first simplification, illustrated in FIG. 15, involves providing in part of plate 1 only those holes 38 which correspond to the constant part of the pattern to be printed. In the example of FIG. 15, this is the monogram SMH. The area corresponding to the variable section of the character is formed with a complete array of holes 39. Projection of ink through holes 38 can then be controlled by a single electrode or a single resistance deposited on plate 1 or plate 2 and extending over the entire area corresponding to the holes 38.

A second simplification is illustrated in FIG. 16. In this device the plate 1 is perforated in the usual manner with a complete array of holes 4 corresponding to the variable and constant parts of the pattern. The constant part of the pattern is printed using a single electrode consisting of a layer of electrically conductive material 41 deposited on plate 2, this layer 41 being in turn covered with an electrically insulating layer 42. The constant part of the pattern is obtained by forming openings 43 in the layer 42 opposite each of the holes 4 corresponding to the required pattern. Layer 41 may be subdivided to form a number of areas which are electrically insulated from one another and separately controlled, so that the energy required to produce projection may be staggered over a period of time. The openings 43 may be formed by photochemical engraving. If plate 2 is made from an electrically conductive material this will serve as the electrode, and layer 41 is superfluous.

The photoconductive embodiments of the device may also be used to print patterns comprising a constant part and a variable part, the constant part being obtained by illuminating the photoconductor through a mask and the variable part using, for example, a diode array, a laser beam or a liquid crystal array.

I claim:

1. A device for projecting ink droplets onto a medium so as to form dots defining one or more patterns, said dots being selected from an array of dots, the device comprising a perforated first plate which in use is adapted to be positioned substantially parallel to and spaced by a small distance from the medium, a second plate attached and substantially parallel to the first plate and defining therewith a chamber for containing ink to be deposited on the medium, and means for projecting from a selected hole in said perforated first plate a small quantity of ink by the application of voltage to at least one plate in conjunction with the passage of electromagnetic radiation through the second plate, wherein the improvement comprises:

said second plate comprises a layer of photoconductive material whose electrical resistivity is reduced by exposure to electromagnetic radiation and a layer of electrically conductive material which is transparent to said radiation disposed in current conductive relation to the side of said photoconductive layer opposite the ink chamber side and an electrically conductive member disposed on the ink chamber side of said photoconductive layer, said device being adapted to have a preselected voltage applied between said electrically conductive layer and member, the value of said voltage being chosen such that exposure of a region of the photoconductive layer registered with a selected hole in said perforated first plate to electromagnetic radiation of predetermined intensity will permit sufficient current flow between the electrically conductive layer and member through said region of photoconductive material to expel an ink droplet from the selected hole as a result of local thermal expansion of the ink.

2. A device according to claim 1, wherein said electrically conductive member comprises a second layer of electrically conductive material disposed in current conducting relation to the ink chamber side of said layer of photoconductive material.

3. A device according to claim 1 or 2, further comprising a set of projections on at least one of said first plate and said second plate partially filling the space between said plates, the height of said projections being equal to or less than the distance separating the first and second plates and the projections being regularly spaced between the axes of holes in said first plate.

4. A device according to claim 1 or claim 2 wherein said first mentioned electrically conductive layer has an electrical resistivity of between $10^{-6}$ ohm-meters and 50 ohm-meters.

5. A device according to claim 1, wherein said photoconductive material is selected from the group consisting of silicon, germanium and cadmium sulphide.

6. A device according to claim 1, further comprising a set of electrically-controlled liquid crystal cells located between the source of said radiation and said photoconductive material, and means for selectively controlling the liquid crystal cells to permit the radiation to impinge on selected parts of the photoconductive layer.

7. A device according to claim 1, further comprising a mask with sections transparent to said radiation and sections opaque thereto located between a source of radiation and said photoconductive material.

8. A device according to claim 1, further comprising a supply of ink filling said chamber, wherein the ink is solid at the normal temperature of operation and is melted by the local increase in temperature resulting from passage of current between said electrically conductive layer and member through a radiation-impinged region of the photoconductive material.

9. A device according to claim 1, wherein said electrically conductive member comprises at least part of the first plate.

10. A device according to claim 9, further comprises a supply of electrically conductive ink filling said ink chamber.

11. A device according to claim 10, wherein the electrical resistivity of the ink is between 50 and 0.05 ohm-meters.

* * * * *

UNITED STATES PATENT AND TRADEMARK OFFICE

CERTIFICATE OF CORRECTION

PATENT NO. : 4,312,009

DATED : 19 January 1982

INVENTOR(S) : Francois Lange

It is certified that error appears in the above—identified patent and that said Letters Patent is hereby corrected as shown below:

Column 1, line 40: after "comprises" delete "in".

Column 1, line 57: after "comprises" delete "in".

Column 2, line 65: after "and" change "=2T/R to -- +2T/R--.

Column 7, line 65: after "is" insert --made--.

Signed and Sealed this

*Eighteenth* Day of *May 1982*

[SEAL]

*Attest:*

GERALD J. MOSSINGHOFF

*Attesting Officer* *Commissioner of Patents and Trademarks*